United States Patent [19]

De Gennes

[11] 4,029,186
[45] June 14, 1977

[54] RADIALLY MOVABLE CLUTCH RELEASE BEARING

[75] Inventor: Gerard De Gennes, Senlis, France

[73] Assignee: Societe Anonyme Francaise du Ferodo, Paris, France

[22] Filed: Mar. 9, 1976

[21] Appl. No.: 665,320

[30] Foreign Application Priority Data

Mar. 21, 1975 France .............................. 75.08847

[52] U.S. Cl. .................................. 192/98; 308/233
[51] Int. Cl.² .................... F16C 19/00; F16C 33/30
[58] Field of Search ........................ 192/98, 110 B; 308/184 A, 184 R, 233, 236

[56] References Cited

UNITED STATES PATENTS

| 3,416,637 | 12/1968 | Maurice | 192/98 |
| 3,815,715 | 6/1974 | Maucher | 192/98 |
| 3,877,557 | 4/1975 | Maucher | 192/98 |
| 3,882,979 | 5/1975 | Limbacher et al. | 192/98 |
| 3,921,775 | 11/1975 | Matyschik | 192/98 |

FOREIGN PATENTS OR APPLICATIONS 1,944,839  1/1971  Germany .............................. 192/98

Primary Examiner—Benjamin W. Wyche
Attorney, Agent, or Firm—Diller, Brown, Ramik & Wight

[57] ABSTRACT

A self-centering clutch release bearing comprises a drive element which acts on the release device of a clutch, connected to an actuating element which co-operates with a displacement control means. The connection between the two elements is a self-centering frictional connection controlled by a Belleville washer which bears with its inner or outer periphery against one of the elements. The washer is connected to the other of the elements by fastening claws which extend around its other periphery.

21 Claims, 15 Drawing Figures

RADIALLY MOVABLE CLUTCH RELEASE BEARING

BACKGROUND OF THE INVENTION

Field of the Invention

This invention relates generally to clutch release bearings of the kind comprising an actuating element which is subject to the action of a displacement control means, and a drive element associated with the actuating element, which acts on the release device of the clutch. The invention is particularly applicable to motor vehicle cluthches.

In particular, the invention relates to those clutch release bearings of this type which are known as self-centering and which, as described in French Pat. No. 1,467,848 of the 20th Dec. 1965, have a self-centering connection which operates by translatory movement between the actuating element and the drive element, and which in a plane perpendicular to the axis of the assembly allows omnidirectional latitude of movement between the two elements which is controlled by the frictional clamping of an elastic clamping washer of the axially acting Belleville washer type.

A self-centering connection of this kind has the advantageous effect of enabling the drive element at any moment to be in or return to the correct operating position coaxial with the clutch which it controls, even if on assembly the clutch release bearing is not exactly coaxial with the clutch.

A main object of the present invention is the provision of a clutch release bearing which comprises only a minimum number of parts and which in addition has other advantages.

SUMMARY

The present invention provides a clutch release bearing of the kind comprising an actuating element adapted for co-operation with displacement control means, and a drive element adapted to act on the release device of a clutch, the actuating and drive elements being operatively connected by a self-centering connection acting by translatory movement and having, in a plane perpendicular to the axis of the whole arrangement, an omnidirectional latitude of movement controlled by an axially-acting elastic clamping washer of the Belleville washer type, and is charcterized in that the Belleville washer bears against either the actuating element or the drive element by either its inner or outer periphery, while around its other periphery it is provided with fastening claws which act by traction and by which it is fastened to the other of the said elements.

Thus, and as the result of the fastening claws which it carries, the Belleville washer is able to act both on the drive element and on the actuating element, while it effect the axial fastening of the actuating and drive elements to one another.

The provision of fastening claws on the Belleville washer makes it possible to dispense with the cover which is customarily used for axially fastening the drive and actuating elements together, with the consequent undesirable increase in diameter of the assembly.

Furthermore, by means of its fastening claws the Belleville washer considerably assists in the assembly of the bearing by enabling the simple clipping of the drive and actuating elements to one another.

DESCRIPTION OF THE PREFERRED EMBODIMENTS

Figure 1:
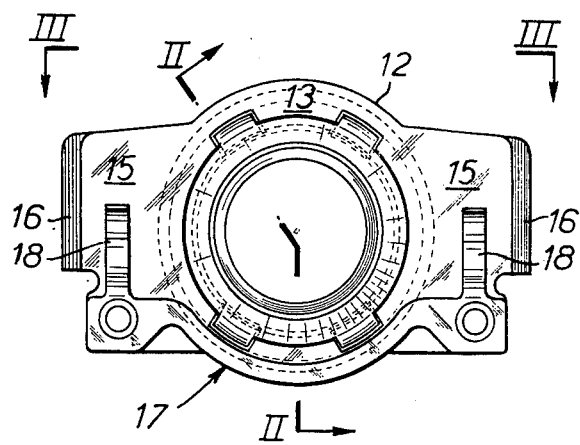
FIG. 1 is a rear view in elevation of a clutch release bearing of the invention.
Figure 2:
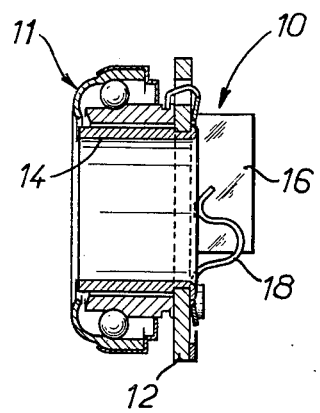
FIG. 2 is a view in axial section of this clutch release bearing, taken on the broken line II—II in FIG. 1.
Figure 3:
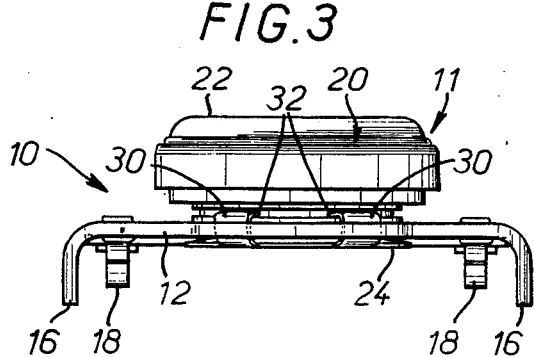
FIG. 3 is a plan view of the clutch release bearing shown in FIGS. 1 and 2, taken on the line III—III in FIG. 1.
Figure 4:
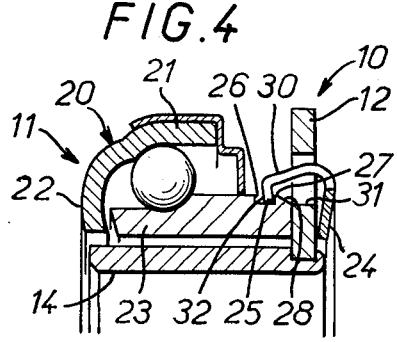
FIG. 4 shows, on a larger scale, a part of FIG. 2.

According to the embodiment shown in FIGS. 1 to 4, the clutch release bearing of the invention comprises generally, in a manner known per se, an actuating element 10 adapted to be operated by a displacement control means such as a release fork (not shown), and a drive element 11 operatively connected to the actuating element 10 and adapted to act on the release device of a clutch (likewise not shown).

The actuating element 10 comprises a transverse plate 12 which consists of a generally annular portion 13, on the inner periphery of which a support sleeve 14 is attached by crimping, and two wings 15 which extend radially in diametrically opposite positions and which terminate in right angle returns 16.

On the rear face of the transverse plate 12 a bar 17 is attached by rivetting; at its ends, facing the wings 15 of the said plate, this bar forms two loops 18 adapted to connect the bearing to its displacement control means.

These arrangements are well known in themselves and do not form part of the present invention.

Likewise in a manner known per se, the associated drive element 11 comprises a ball bearing 20 the outer race 21 of which is adapted to bear against the release device of the clutch which is to be controlled; this outer race it extended axially towards the front of the bearing by a flange 22 which is generally rounded in the direction of the axis of the assembly.

Together with its flange, an outer race of this kind may advantageously be produced by a stamping or rolling operation.

In order to make a self-centering connection betweeen the drive element 11 and the actuating element 10, the inner race 23 of the bearing 20 is urged by a Belleville washer 24 in the direction of the transverse plate 12 and in practice is held by this Belleville washer with its edge bearing against the plate as illustrated.

In the example illustrated in FIGS. 1 to 4 the inner race 23 of the bearing 20 is a machined part and has on its outer periphery a support shoulder 25 for co-operating with the Belleville washer 24, as will be described hereinbelow.

In the embodiment shown in FIGS. 1 to 4 this support shoulder 25 comprises one of the transverse flanks of a shallow groove 26 which is provided in the outer periphery of the inner race 23 of the bearing 20; the support shoulder 25 is bounded peripherally by a cylindrical bearing surface 27 and the latter is preferably, as shown in the drawing, preceded by a frusto-conical engagement or bearing surface 28 whose diameter decreases in the direction away from the cylindrical bearing surface 27.

An inner race of this kind and its groove may be produced by machining.

In the embodiment shown in FIGS. 1 to 4, the Belleville washer 24 is disposed axially on the opposite face of the transverse plate 12 in relation to the drive element 11.

By its inner periphery, the washer 24 bears against the transverse plate 12 and along its outer periphery it carries fastening claws 30 which act by traction and by which it is fastened to the drive element 11.

In practice, and as illustrated, these fastening claws 30, which extend generally axially, pass through passages 31 provided for the purpose in the transverse plate 12 and beyond these passages have substantially radial returns 32 directed towards the axis of the assembly which engage the support shoulder 25 provided in the outer periphery of the inner race 23.

The fastening claws 30 of the Belleville washer 24 are integral with the washer and produced with the washer in one operation.

As will be readily understood, in the assembly of the drive element 11 and the actuating element 10, it is sufficient to move the drive element 11 axially towards the transverse plate 12 until, as the frusto-conical bearing surface 28 provided at the end of the inner race 23 comes into contact with the end returns 32 of the fastening claws 30 of the Belleville washer, these fastening claws 30 deform elastically and pass beyond the cylindrical bearing surface 27 peripherally bounding the support shoulder 35; since the fastening claws 30 of the Belleville washer 24 are then able to resume their original position, the end returns 32 come into engagement with the support shoulder 25, and effectively fasten the drive element 11 and actuating element 10 together with an axial clamping action.

Furthermore, owing to the fact that at its inner periphery, by which it is in contact with the transverse plate 12, the Belleville washer 24 is able to move radially in all directions in relation to the plate, the drive element 11 will have, in relation to the actuating element 10, an omnidirectional latitude of movement in a plane perpendicular to the axis of the assembly, this plane in practice coinciding with the front face of the transverse plate 12; this omnidirectional latitude of movement will be controlled by the Belleville washer 24, which effects an axial traction on the drive element 11 with the aid of its fastening claws 30.

The self-centering connection operating by translatory movement between the drive element 11 and the operating element 10 is thus achieved with the aid of a single part consisting of the Belleville washer 24 and its fastening claws 30.

In the foregoing the fastening claws 30 of the Belleville washer 24 are provided on the outer periphery of the washer, and this outer periphery moveover extends radially towards the axis of the assembly.

Figure 5:
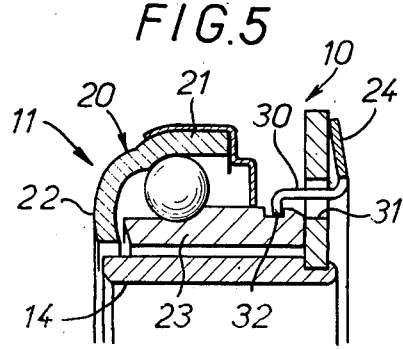
FIGS 5 to 15 are similar views to those in FIG. 4, each relating respectively to a modified embodiment.

In the modified embodiment shown in FIG. 5 the fastening claws 30 of the Belleville washer 24 are formed on the inner periphery of the washer, and the outer periphery of this washer 24 extends radially away from the axis of the assembly.

Figure 6:
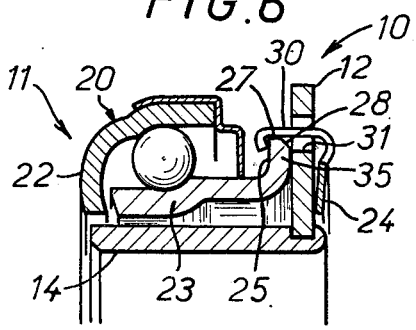
Figure 7:
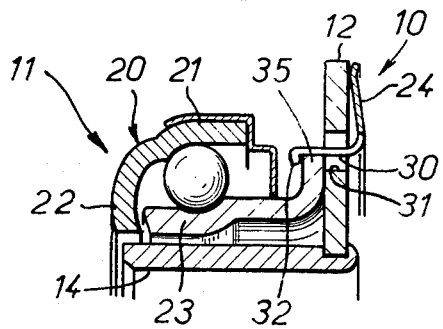

In the embodiments illustrated in FIGS. 6 and 7 the support shoulder 25 provided on the drive element 11 is, as previously, formed on the outer periphery of the inner race 23 of the bearing 20, but it is composed of one of the transverse faces of a collar 35 which the inner race 23 carries radially for this purpose at its corresponding end, the face of the collar which faces the transverse plate 12 having a frusto-conical bearing surface 28 forward of the cylindrical bearing surface 27 which peripherally bounds the support shoulder 25.

An inner race 23 of this kind may be produced equally well by machining as by stamping or rolling.

In FIG. 6 the fastening claws 30 of the Belleville washer 24 are provided on the outer periphery of the latter, and in FIG. 7 they are provided on the inner periphery of the washer.

At the same time, as illustrated in FIG. 7, the outer periphery of the Belleville washer 24, by which the latter bears against the rear face of the transverse plate 12, is rounded; this arrangement clearly can be adopted for any of the embodiments of the invention.

Figure 8:
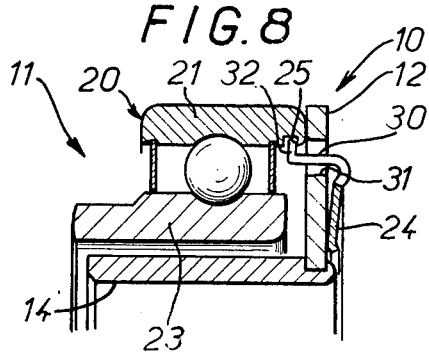
Figure 9:
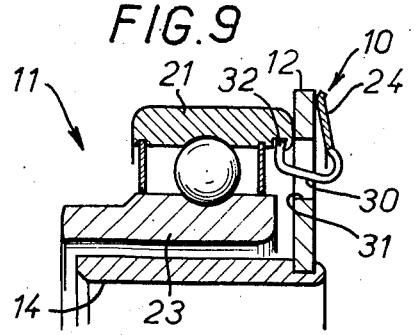

In the embodiments shown in FIGS. 8 and 9, the support shoulder 25 provided on the drive element 11 for the action of the Belleville washer 24 is formed on the outer race 21 of the bearing 20 provided in the said drive element 11, and more precisely, in the example illustrated, on the inner periphery of this outer race.

In the case of an outer race made by machining, as illustrated in FIGS. 9 and 8 the support shoulder 25 may be constituted by one of the transverse flanks of a groove provided for this purpose on this track.

Figure 10:
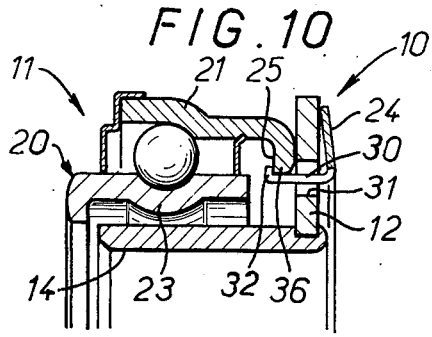
Figure 11:
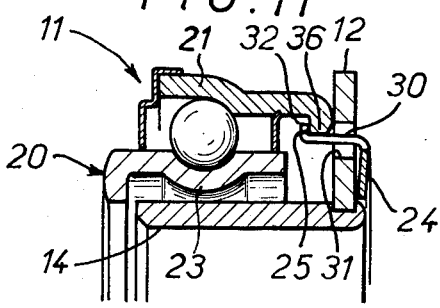

As a variant, in FIGS. 10 and 11, where the race is made by stamping or rolling, the support shoulder 25 may be constituted by one of the transverse faces of a collar 36 formed radially at the corresponding end of this outer race.

In FIGS. 8 and 11 the fastening claws 30 of the Belleville washer are formed on the outer periphery thereof; in FIGS. 9 and 10 they are formed on the inner periphery of the washer; in all cases the substantially radial returns 32 provided on the fastening claws 30 of the Belleville washer are directed away from the axis of the assembly.

Figure 12:
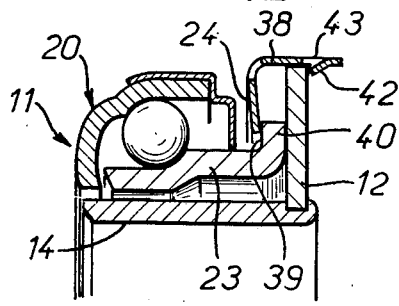
Figure 13:
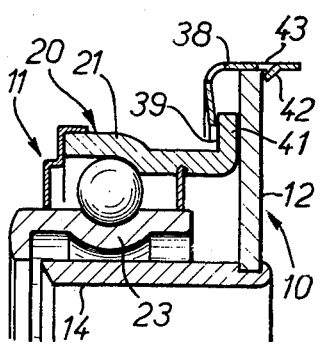

In the modified embodiments illustrated in FIGS. 12 and 13 the Belleville washer is disposed axially on the same side of the plate 12 as the drive element 11.

The fastening claws 38 which are then provided on the outer periphery of the washer 24 are in engagement with the transverse plate 12, while by its inner periphery the Belleville washer 24 is in engagement with a support shoulder 39 provided for that purpose on the drive element 11.

In the embodiment shown in FIG. 12 this support shoulder 39 is formed by one of the transverse faces of a collar 40 provided radially at the corerponding end of the inner race 23; in the embodiment shown in FIG. 13 this support shoulder is formed similarly by one of the transverse faces of a collar 41 provided at the corresponding end of the outer race 21.

However this may be, each fastening claw 38 of the Belleville washer 24 is provided with a tongue 42 adapted to pass elastically over the transverse plate 12 to hook over the plate and to engage with its opposite face.

In the example illustrated a tongue 42 of this kind is formed simply by a partially cut-out portion 43 provided in the corresponding fastening claw 38.

In all cases the Belleville washer 24 is placed in position on the drive element 11 during the actual assembly of the inner and outer races forming the bearings provided in this element, and when this drive element is joined to the associated actuating element 10 the fastening claws 38 of the Belleville washer 24 are elastically clipped over the transverse plate 12, the tongues 42 provided on these fastening claws 38 engaging with the opposite face of the transverse plate 12 to that against which the drive element 11 bears.

An arrangement of this kind provides the advantage of leaving the rear face of the transverse plate 12 of the actuating element 10 entirely free, and therefore assists the installation of the fastening means for connecting this actuating element to its axial displacement control means.

Figure 14:
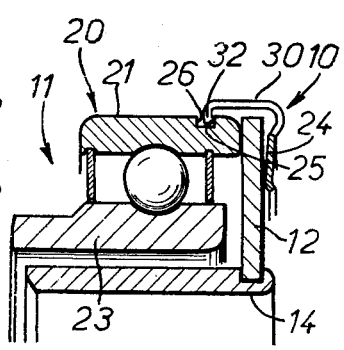
Figure 15:
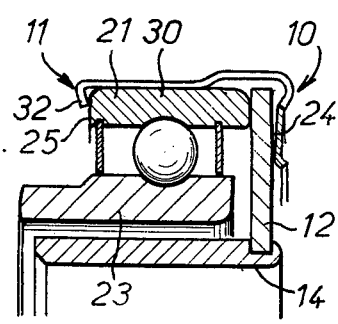

In the modified embodiment illustrated in FIGS. 14 and 15 the Belleville washer 24 is disposed on the other side of the plate 12 in relation to the drive element 11, and its fastening claws 30 extend axially beyond the peripheral edge of the said plate.

In FIG. 14 the face 25 with which the substantially radial end returns 32 of these fastening claws 30 cooperate is formed by one of the transverse flanks of a groove 26 provided in the outer periphery of the outer race 21, and this outer race is a machined part.

In FIG. 15 this support shoulder is formed by the actual end face of this outer race 21 which is axially furthest from the Belleville washer 24.

The present invention is not limited to the embodiments described and illustrated, but includes any alternative construction and/or combination of their various elements within the scope of the appended claims.

In particular, in the case of the embodiment illustrated in FIGS. 12 and 13 the fastening claws 38 of the Belleville washer 24 may be circularly continuous and thus form a crown, and/or the inner periphery of this Belleville washer may have elastically deformable claws enabling it to move elastically in one direction beyond the periphery of the support shoulder 39 formed on the drive element 11, when the whole arrangement is clipped together, and this support shoulder may then also be formed by one of the transverse flanks of a groove which is formed, for example, in a machined race of the bearing 20, as described above in connection with FIGS. 4, 5, 8, or 9.

Furthermore, a friction washer may be interposed between the drive element and the actuating element.

Moreover, the transverse plate of the actuating element may equally be of metal or of synthetic material, and in this case may be at least partially faced with plastics material.

Finally, the bearing surface peripherally bounding the support shoulder is not necessarily cylindrical; particulary when a frusto-conical bearing surface is provided it may even be identical with the latter.

I claim:

1. A clutch release bearing of the kind comprising an actuating element having means for cooperation with clutch actuating means, and a drive element having a surface portion for cooperation with a clutch release member, said clutch release bearing having an axis, a self-centering connecting means of one-piece resilient construction connecting said actuating element and drive element together and permitting relative movements in all directions in a plane perpendicular to the axis of said clutch release bearing, and said self-centering connecting means comprising an axially acting resilient clamping Belleville washer bearing on one periphery thereof against one of said elements, and integral fastening claws disposed around and projecting from said other periphery of said Belleville washer in spaced relation, said fastening claws being engaged with said other element and acting in tension thereon while said Belleville washer axially resiliently urges said elements towards each other.

2. A clutch release bearing according to claim 1, wherein said actuating element includes a transverse plate, said Belleville washer urging said drive element towards said transverse plate.

3. A clutch release bearing according to claim 2, wherein said Belleville washer is disposed axially on the side of said transverse plate remote from said drive element.

4. A clutch release bearing according to claim 3, wherein passages are provided through said transverse plate, said fastening claws extending through said passages.

5. A clutch release bearing according to claim 1, wherein said fastening claws extend outwardly beyond the periphery of said transverse plate.

6. A clutch release bearing according to claim 1, wherein said fastening claws extend generally longitudinally relative to the axis of said clutch release bearing.

7. A clutch release bearing according to claim 6, wherein each of said fastening claws has at its free end a bent-over portion engaging a complementary support surface on said drive element.

8. A clutch release bearing according to claim 7, wherein said complementary support surfaces are defined by a support shoulder on said drive element.

9. A clutch release bearing according to claim 1, wherein said Belleville washer is positioned generally coaxial of said clutch release bearing with said fastening claws being disposed about the outer periphery of said Belleville washer.

10. A clutch release bearing according to claim 1, wherein said Belleville washer is generally coaxial of said clutch release bearing, said fastening claws being disposed about the inner periphery of said Belleville washer.

11. A clutch release bearing according to claim 2, wherein said Belleville washer is disposed axially on the same side of said transverse plate as said drive element, said fastening claws being disposed about the outer periphery of said Belleville washer and are in engagement with said transverse plate, the inner periphery of said Belleville washer bearing against a support shoulder provided on said drive element.

12. A clutch release bearing according to claim 11, wherein each fastening claw extending beyond said transverse plate and is provided with a resilient tongue resiliently hooking onto the face of said transverse plate remote from said drive element.

13. A clutch release bearing according to claim 12, wherein each tongue is a partially cut-out portion of its corresponding fastening claws.

14. A clutch release bearing according to claim 8, wherein said support shoulder comprises one of the transverse flanks of a flanged portion disposed on said drive element radially of the axis of said clutch release bearing.

15. A clutch release bearing according to claim 8, wherein said support shoulder is formed by one of the transverse flanks of a groove formed in said drive element.

16. A clutch release bearing according to claim 8, wherein said support shoulder adjoins a cylindrical bearing surface against which said fastening claws bear.

17. A clutch release bearing according to claim 8, wherein a frusto-conical surface precedes said support shoulder relative to said Belleville washer for deforming said fastening claws during assembly before they come into securing position.

18. A clutch release bearing according to claim 8, wherein said drive element includes a bearing having an outer race member, and said support shoulder being provided on said drive element on one periphery of said outer race member.

19. A clutch release bearing according to claim 8, wherein said drive element includes a bearing having an inner race member, and said support shoulder being provided on said drive element on one periphery of said inner race member.

20. A clutch release bearing according to claim 8, wherein said drive element comprises a bearing having an outer race member, and said support shoulder being formed by an end face of the outer race member remote from said Belleville washer.

21. A clutch release bearing according to claim 1, wherein said fastening claws are of a resilient construction and are shaped into place on their respective support surfaces when said elements are brought together in the assembly of said clutch release bearing.

* * * * *